United States Patent
Nakao et al.

(10) Patent No.: US 9,745,400 B2
(45) Date of Patent: Aug. 29, 2017

(54) METHOD FOR PRODUCING POLYACETAL COPOLYMER

(71) Applicant: Polyplastics Co., Ltd., Tokyo (JP)

(72) Inventors: Hiroaki Nakao, Fuji (JP); Eiji Masuda, Tokyo (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 15/119,567

(22) PCT Filed: Dec. 10, 2014

(86) PCT No.: PCT/JP2014/082631
§ 371 (c)(1),
(2) Date: Aug. 17, 2016

(87) PCT Pub. No.: WO2015/151343
PCT Pub. Date: Oct. 8, 2015

(65) Prior Publication Data
US 2017/0114176 A1    Apr. 27, 2017

(30) Foreign Application Priority Data

Mar. 31, 2014 (JP) .................................. 2014-071310

(51) Int. Cl.
*C08G 2/28* (2006.01)
*C08G 2/10* (2006.01)
(Continued)

(52) U.S. Cl.
CPC ................ *C08G 2/28* (2013.01); *C08G 2/06* (2013.01); *C08G 2/10* (2013.01)

(58) Field of Classification Search
CPC ....................................................... C08G 2/28
(Continued)

(56) References Cited

U.S. PATENT DOCUMENTS

| 4,661,570 A | 4/1987 | Yamawaki et al. |
| 4,692,290 A | 9/1987 | Steele et al. |

(Continued)

FOREIGN PATENT DOCUMENTS

| CN | 1165832 A | 11/1997 |
| JP | S61-238812 A | 10/1986 |

(Continued)

OTHER PUBLICATIONS

Office Action in Chinese Patent Application No. 201480073491.0 dated Nov. 28, 2016.

(Continued)

*Primary Examiner* — Duc Truong
(74) *Attorney, Agent, or Firm* — Knobbe Martens Olson & Bear LLP (57) ABSTRACT

A high-quality polyacetal produced by a process including supplying a raw material comprising trioxane, a comonomer capable of copolymerizing with trioxane and a non-volatile protonic acid to a reactor of a continuous stirring/mixing machine type; carrying out a polymerization reaction of the raw material to produce a reaction mixture; vaporizing an unreacted monomer to separate the unreacted monomer from the reaction mixture and supplying the unreacted monomer to the raw material supplying; collecting a polyacetal copolymer from the reaction mixture into a collection unit which is arranged downstream from a discharge port and is adjusted to have a gauge pressure of 0.2 kPa or more; and adding a basic compound to the collected polyacetal and then subjecting the resultant mixture to a melt-kneading treatment to deactivate the non-volatile protonic acid.

13 Claims, 1 Drawing Sheet

(51) Int. Cl.
*C08G 2/06* (2006.01)
*C08G 2/12* (2006.01)

(58) Field of Classification Search
USPC .......................................................... 528/234
See application file for complete search history.

(56) References Cited

U.S. PATENT DOCUMENTS

| | | | |
|---|---|---|---|
| 5,344,911 A | 9/1994 | Yamamoto et al. | |
| 5,866,670 A | 2/1999 | Nakai et al. | |
| 5,886,139 A | 3/1999 | Yamamoto et al. | |
| 6,037,439 A | 3/2000 | Serizawa et al. | |
| 6,139,804 A | 10/2000 | Tanigawa et al. | |
| 9,546,241 B2 * | 1/2017 | Monma | C08G 2/24 |
| 9,550,853 B2 * | 1/2017 | Monma | C08G 2/12 |
| 2007/0191588 A1 | 8/2007 | Schwittay et al. | |

FOREIGN PATENT DOCUMENTS

| | | |
|---|---|---|
| JP | S62-119219 | 5/1987 |
| JP | H03-128911 | 5/1991 |
| JP | H05-008725 | 2/1993 |
| JP | H05-247157 | 9/1993 |
| JP | H05-247158 | 9/1993 |
| JP | H08-059767 | 3/1996 |
| JP | H09-278852 | 10/1997 |
| JP | H10-330443 A | 12/1998 |
| JP | H11-255854 | 9/1999 |
| JP | H11-124422 | 11/1999 |
| JP | 2007-538122 A | 12/2007 |
| JP | 2009-248441 | 10/2009 |
| JP | 2009-249451 | 10/2009 |
| WO | WO 96/13534 | 9/1996 |

OTHER PUBLICATIONS

International Search Report in International Application No. PCT/JP2014/059957 dated Jun. 17, 2014.
International Search Report in International Application No. PCT/JP2014/059958 dated Jun. 17, 2014.
Extended European search report in European Patent Application No. 14888543.7 dated Feb. 20, 2017.

* cited by examiner

METHOD FOR PRODUCING POLYACETAL COPOLYMER

This application is the U.S. National Phase under 35 U.S.C. §371 of International Application PCT/JP2014/082631, filed Dec. 10, 2014, designating the U.S., and published in Japanese as WO 2015/151343 on Oct. 8, 2015, which claims priority to Japanese Patent Application No. 2014-071310, filed Mar. 31, 2014, the entire contents of which are incorporated herein by reference.

TECHNICAL FIELD

The present invention relates to a method of manufacturing a polyacetal copolymer.

BACKGROUND ART

As a conventional method of manufacturing a polyacetal copolymer, the cation copolymerization is known in which trioxane and a cyclic ether and/or cyclic formal having at least one carbon-carbon bond are used as a main monomer and a comonomer, respectively. Cationic active catalysts used for the above copolymerization may include Lewis acid, in particular, halides of boron, tin, titanium, phosphorus, arsenic and antimony, for example, boron trifluoride, tin tetrachloride, titanium tetrachloride, phosphorus pentachloride, phosphorus pentafluoride, arsenic pentafluoride and antimony pentafluoride, and compounds such as complexes or salts thereof: protonic acid, for example, perchloric acid; esters of protonic acid, in particular, esters of perchloric acid and lower aliphatic alcohol, for example, tert-butyl perchlorate ester; anhydrides of protonic acid, in particular, mixed anhydrides of perchloric acid and lower aliphatic carboxylic acid, for example, acetyl perchlorate, or alternatively trimethyloxonium hexafluorophosphate, triphenyl-methyl-hexafluoro alzenate, acetyl tetrafluoroborate, acetyl hexafluorophosphate, acetyl hexafluoro alzenate and the like. Among these, boron trifluoride, or coordination complexes of boron trifluoride and organic compounds, for example, ethers are the most common catalysts for polymerization in which trioxane is used as a main monomer, and they are widely used in industries.

However, in the case of polymerization catalysts commonly used, such as a boron trifluoride-based compound, the polymerization rate may decrease rapidly in the late stage of polymerization, and thus the polymerization conversion percentage can hardly reach near 100% in a short time, resulting in a very time-consuming and inefficient process. Further, decomposition of a polymer product promoted by the action of a catalyst may become relatively favored in the late stage of polymerization, resulting in decreased molecular weights and even deteriorated qualities such as thermal stability. Further, increasing the amount of a polymerization catalyst may generally promote the polymerization rate and also improve the polymerization convention percentage, but is not necessarily preferred in view of the overall efficiency of the manufacturing process because the quality of a crude polymer product may be increasingly deteriorated, requiring complicated stabilization treatment in the subsequent steps.

Accordingly, the following approach is widely used: a solution comprising a catalyst-deactivating agent is added at a stage of a relatively low polymerization percentage to quench polymerization, and remaining unreacted monomers are washed, recovered and purified for recycling.

Further, a plurality of approaches for improving a polymerization conversion percentage have also been proposed, comprising: improving a polymerization machine; and improving a method of supplying a catalyst. For example, proposed are an approach in which a polymerization machine is inclined by 1 to 10° to improve a polymerization conversion percentage per equipment (Patent Document 1) and an approach in which a weir is provided at a discharge outlet of a polymerization machine (Patent Document 2) as well as methods in which a catalyst and a comonomer are pre-mixed, and then added to trioxane (Patent Documents 3 and 4). These approaches are each effective for increasing a polymerization conversion percentage when a boron trifluoride-based polymerization catalyst is used.

Further, an approach has also been proposed in which unreacted monomers are directly recovered for recycling without deactivating and washing a crude polymer at the late stage of polymerization by virtue of a highly-active and nonvolatile polymerization catalyst (Patent Document 5). According to the above approach, monomers can be recovered directly from a crude polymer before deactivation, which is difficult to achieve when the conventional boron trifluoride systems are used. Further, side reactions also tend not to occur at a stage where a high conversion percentage is reached as compared with a case where a boron trifluoride-based polymerization catalyst is used. Therefore, a crude polymer containing a less amount of unreacted monomers and having excellent thermal stability can be obtained via a very simple process.

Patent Document 1: Japanese Examined Patent Application Publication No. H05-008725
Patent Document 2: PCT International Publication No. WO 1996/13534
Patent Document 3: Japanese Unexamined Patent Application Publication No. H11-255854
Patent Document 4: Japanese Unexamined Patent Application Publication No. H11-124422
Patent Document 5: Japanese Unexamined Patent Application Publication No. H09-278852

DISCLOSURE OF THE INVENTION

Problems to be Solved by the Invention

However, in a case where a solution containing a catalyst-deactivating agent is added at a stage of a relatively low polymerization percentage to quench polymerization, and remaining unreacted monomers are washed, recovered and purified for recycling, complicated steps as well as more energy are required for separation and purification in order to recycle the unreacted monomers because they are recovered in a relatively low-concentrated solution. On the other hand, if unreacted monomers are not recovered, they suffer complete loss. Therefore, neither of the cases is economically preferred.

Further, the approaches described in Patent Documents 1 to 4, in which a resulting crude polymer obtained contains 10 wt % or more of unreacted monomers, remain problematic in that deactivation and washing steps are required for practical use; and in addition, side reactions such as decomposition cannot be avoided at a stage where a high conversion percentage is reached when a boron trifluoride-based polymerization catalyst is used.

Moreover, the approach described in Patent Document 5 is susceptible to improvements in the quality and production cost of a polyacetal copolymer.

Accordingly, an objective of the present invention is to manufacture a high quality polyacetal copolymer at low cost in a simple process.

Means for Solving the Problems

The present inventors have conducted extensive studies about the polymerization of trioxane, and the recovery of a crude polymer obtained from the above polymerization in order to achieve the above objective. As a result, the present inventors find that a high quality polyacetal copolymer can be obtained by (i) copolymerizing trioxane with a comonomer in the presence of a polymerization catalyst of a nonvolatile protonic acid, (ii) adjusting the pressure inside a recovery section in which the resulting polyacetal copolymer is to be recovered to a gage pressure of 0.2 kPa or more when recovering the polyacetal copolymer, (iii) adding a basic compound to the polyacetal copolymer recovered in the recovery section, and performing melt-kneading treatment to deactivate the nonvolatile protonic acid catalyst, thereby preventing decomposition of the polymer when performing melt-kneading. Then the present invention has been completed. Specifically, the present invention provides the followings.

(1) The present invention provides a method of manufacturing a polyacetal copolymer, the method comprising: a raw material-introducing step of introducing a raw material comprising a trioxane, a comonomer copolymerizable with the trioxane and a nonvolatile protonic acid to a reaction apparatus of a continuous stirring mixer-type having two parallel axes rotating in the same direction or in different directions relative to each other, a large number of paddles attached on each of the axes and a barrel located close to the outer peripheries of the paddles, wherein ends of long axes of the paddles are configured to periodically approach ends of short axes of their counterparts, and the raw material is to be introduced through an inlet provided at one end in the axial direction, and a reaction mixture and unreacted monomers are to be withdrawn from an outlet provided at the other end; a polymerization reaction step of performing a polymerization reaction of the raw material to obtain the reaction mixture; an unreacted-monomer re-introducing step of performing vapor separation of the unreacted monomers from the reaction mixture, and supply the unreacted monomers to the raw material-introducing step; a polyacetal copolymer-recovery step of recovering a polyacetal copolymer from the reaction mixture into a recovery section provided downstream of the outlet and adjusted to a gage pressure of 0.2 kPa or more; and a deactivation step of adding a basic compound to the polyacetal copolymer recovered at the polyacetal copolymer-recovery step, and performing melt-kneading treatment to deactivate the nonvolatile protonic acid. Note that a gage pressure is measured using the atmospheric pressure as the reference of pressure zero, and means a difference between an absolute pressure and the atmospheric pressure.

(2) Further, the present invention provides the method of manufacturing a polyacetal copolymer according to (1), wherein the gage pressure is adjusted by charging an inert gas from the outlet, a location upstream of the recovery section or the vicinity thereof.

(3) Further, the present invention provides the method of manufacturing a polyacetal copolymer according to (1) or (2), wherein the content of moisture contained in the polyacetal copolymer recovered at the polyacetal copolymer-recovery step is 0.1 parts by weight or less.

(4) Further, the present invention provides the method of manufacturing a polyacetal copolymer according to any one of (1) to (3), wherein the content of unreacted trioxane contained in the polyacetal copolymer recovered at the polyacetal copolymer-recovery step is 1.0 part by weight or less.

(5) Further, the present invention provides the method of manufacturing a polyacetal copolymer according to any one of (1) to (4), wherein the nonvolatile protonic acid comprises at least one selected from heteropolyacids, isopolyacids or acid salts thereof.

(6) Further, the present invention provides the method of manufacturing a polyacetal copolymer according to (5), wherein the nonvolatile protonic acid comprises a heteropolyacid represented by the following general formula (1) or an acid salt thereof:

$$H_x[M_m \cdot M'_n O_l] \cdot yH_2O \quad (1)$$

wherein in the general formula (1), M represents a central element selected from P and/or Si, and M' represents one or more coordinating elements selected from W, Mo and V; and l is 10 to 100, and m is 1 to 10, and n is 6 to 40, and x is 1 or more, and y is 0 to 50.

(7) Further, the present invention provides the method of manufacturing a polyacetal copolymer according to (5) or (6), the heteropolyacid or an acid salt thereof comprises at least one compound selected from phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid or acid salts thereof.

(8) Further, the present invention provides the method of manufacturing a polyacetal copolymer according to (5), wherein the nonvolatile protonic acid comprises an isopolyacid represented by the following general formula (2) or (3) or an acid salt thereof:

$$xM_2^I O \cdot pM_2^V O_6 \cdot yH_2O \quad (2)$$

$$xM_2^I O \cdot pM_2^{VI} O_6 \cdot yH_2O \quad (3)$$

wherein in the general formula (2) and (3), $M^I$ represents hydrogen optionally replaced with a metal in some occurrences; $M^V$ represents one or more elements selected from V, Nb and Ta in the V group of the periodic table; $M^{VI}$ represents one or more elements selected from Cr, Mo, W and U of the VI group in the periodic table; and p and x are 1 or more, and y is 0 to 50.

(9) Further, the present invention provides the method of manufacturing a polyacetal copolymer according to (5) or (8), wherein the isopolyacid or an acid salt thereof comprises at least one compound selected from paratungstic acid, metatungstic acid, paramolybdic acid, metamolybdic acid, paravanadic acid, metavanadic acid or acid salts thereof.

(10) Further, the present invention provides the method of manufacturing a polyacetal copolymer according to any one of (1) to (9), wherein the monomer comprises at least one selected from 1,3-dioxolane, diethylene glycol formal, 1,4-butanediol formal, ethylene oxide.

(11) Further, the present invention provides the method of manufacturing a polyacetal copolymer according to any one of (1) to (10), wherein the basic compound comprises at least one selected from triazine ring-containing compounds having amino groups or substituted amino groups; carbonate, hydrogencarbonate or carboxylate salts of alkali metal elements or alkali earth metal elements or hydrates thereof.

(12) Further, the present invention provides the method of manufacturing a polyacetal copolymer according to (11), wherein the carbonate, hydrogencarbonate or carboxylate salt of an alkali metal element or an alkali earth metal element or a hydrate thereof comprises at least one selected from sodium formate, sodium acetate, sodium carbonate, sodium hydrogen carbonate, disodium succinate, sodium laurate, sodium palmitate, sodium stearate or calcium stearate.

(13) Further, the present invention provides the method of manufacturing a polyacetal copolymer according to any one of (1) to (12), wherein the polyacetal copolymer after deactivation of the nonvolatile protonic acid at the deactivation step has a melt index of the polyacetal copolymer of 10 g/10 min or less as measured at 190° C. with a load of 2160 g, an amount of formaldehyde released from the polyacetal copolymer of 100 ppm or less and a b value of the polyacetal copolymer of 2.0 or less as measured with a color difference meter.

Effects of the Invention

According to the present invention, a high quality polyacetal copolymer can be manufactured at low cost in a simple process.

PREFERRED MODE FOR CARRYING OUT THE INVENTION

Below, specific embodiments of the present invention will be described in detail, but the present invention shall not be limited to the following embodiments in any sense. The present invention can be implemented with appropriate modifications without departing from the scope of the present invention.

The manufacturing method according to the present invention comprising a raw material-introducing step (S1), a polymerization reaction (S2) step, an unreacted-monomer re-introducing step (S3), a polyacetal copolymer-recovery step (S4) and a deactivation step (S5).

<Polyacetal Copolymer Manufacturing Apparatus 1>

Figure 1:
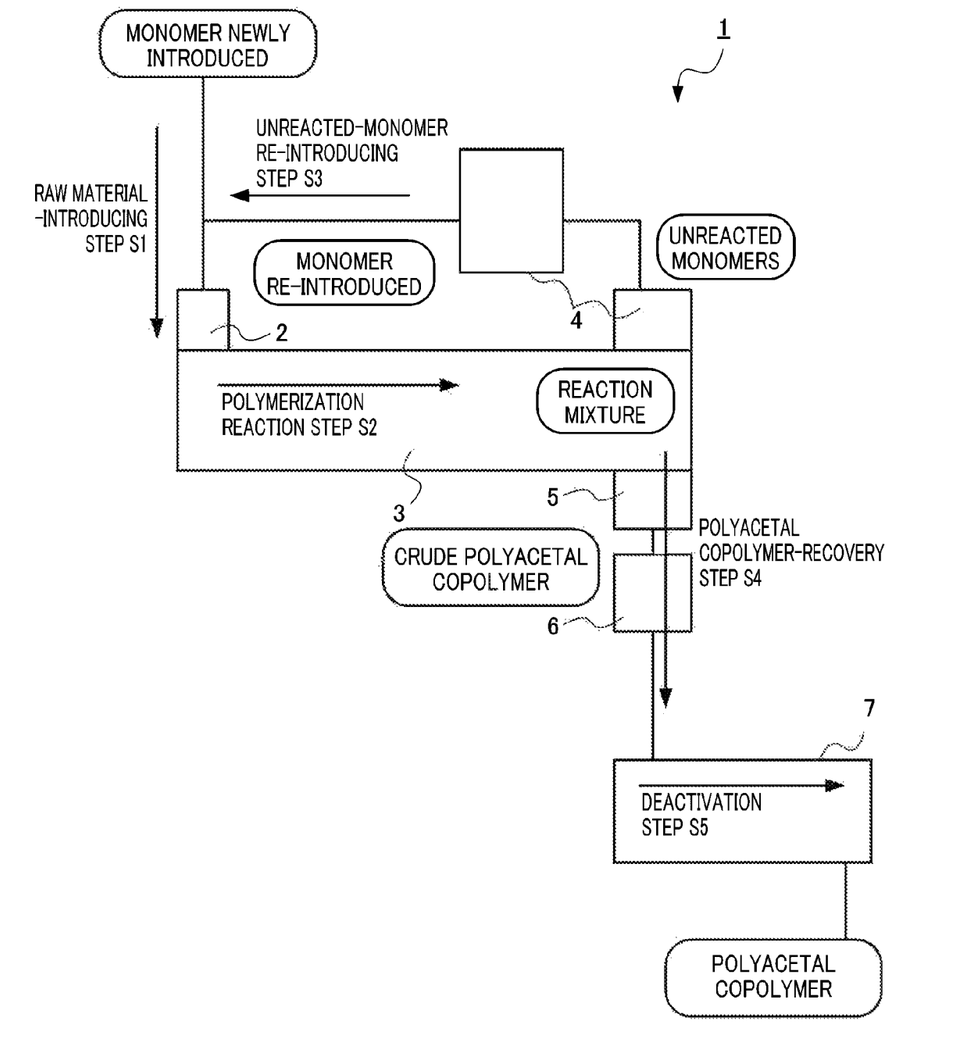
FIG. 1 shows a schematic view illustrating a polyacetal copolymer manufacturing apparatus 1.

Before describing the steps (S1) to (S5), the overall configuration of the polyacetal copolymer manufacturing apparatus 1 is first described with reference to FIG. 1. FIG. 1 shows a schematic view illustrating the polyacetal copolymer manufacturing apparatus 1. The polyacetal copolymer manufacturing apparatus 1 comprises an inlet 2 for introducing a raw material, a mixing section 3 for performing a polymerization reaction of the raw material in the presence of a nonvolatile protonic acid as a polymerization catalyst to obtain a reaction mixture, a vapor separating section 4 for performing vapor separation of unreacted monomers from the reaction mixture, an outlet 5 provided at the other end of the mixing section 3 for withdrawing a crude polyacetal copolymer from the reaction mixture, a crude polyacetal copolymer recovery section 6 provided downstream of the outlet 5 for recovering the crude polyacetal copolymer and a melt-kneading section 7 for adding a basic compound to the crude polyacetal copolymer recovered at the crude polyacetal copolymer recovery section 6, and performing melt-kneading treatment to deactivate the nonvolatile protonic acid.

[Mixing Section 3]

The mixing section 3 is a continuous stirring mixer having two parallel axes rotating in the same direction or in different directions relative to each other, a large number of paddles attached on each of the axes and a barrel located close to the outer peripheries of the paddles, in which ends of long axes of the paddles are configured to periodically approach ends of short axes of their counterparts, and a raw material is to be introduced through the inlet 2 provided at one end in the axial direction, and a reaction mixture and unreacted monomers are to be withdrawn from an outlet provided at the other end.

The mixing section 3 has a jacket for temperature control, through which a liquid or a gas can flow to adjust temperature. Multiple jackets may be provided along the axial direction, each of which may be capable of controlling a temperature.

Further, a reaction may be performed in a state where the continuous stirring mixer is lifted at the side of the outlet to create a certain inclination in the horizontal direction, if desired.

Note that a clearance between the front end of each paddle and the inner surface of the barrel is preferably 2% or less of the diameter of the circumscribed circle of each paddle, and more preferably 1% or less.

Moreover, there is no particular limitation for the rotation seed of the paddles, but the rotation peripheral speed at the front ends of the paddles is preferably 1.5 m/second or less.

Furthermore, the two rotational axes may both rotate in the same direction, and may rotate in different directions relative to each other.

Meanwhile, the crude polyacetal copolymer is preferably a fine powder-particle material although it is not an indispensable aspect. Specifically, the through-sieve proportion is preferably 90 parts by weight or more when the crude polyacetal copolymer is screened with a sieve having an opening of 11.2 mm. More preferably, the through-sieve proportion is 90 parts by weight or more when the crude polyacetal copolymer is screened with a sieve having an opening of 4.0 mm. Even more preferably, a through-sieve proportion is 90 parts by weight or more when the crude polyacetal copolymer is screened with a sieve having an opening of 2.0 mm. Therefore, the mixing section 3 preferably has a function for providing sufficient grinding of a bulk polymer material, but a separate grinder mill apart from the mixing section 3 may be used to grind a reaction product after polymerization.

In a case where the particle diameter of a crude polyacetal copolymer is too large, even after a basic compound is added to the crude polyacetal copolymer to deactivate a polymerization catalyst and also to stabilize unstable termini of the crude polyacetal copolymer, the thermal stability, the amount of released formaldehyde and the melt index of the stabilized polyacetal copolymer may be less than satisfactory. Moreover, the b value may also be high for the hue of pellets of the stabilized polyacetal copolymer.

[Crude Polyacetal Copolymer Recovery Section 6]

The crude polyacetal copolymer recovery section 6 is provided downstream of an outlet 5, and adjusted to a gage pressure of 0.2 kPa or more. There is no particular limitation for the material and shape of a recovery container of the crude polyacetal copolymer recovery section 6. Examples of the recovery container may include metal tanks. Further, the recovery container preferably comprises a provision of a degassing line for removing a gas component generated, such as formaldehyde generated from a crude polyacetal copolymer.

The crude polyacetal copolymer recovery section 6 is adjusted to a gage pressure of 0.2 kPa or more in the inside of the recovery container. A gage pressure of 0.2 kPa or more suffices for the purposes of the present invention, but it is preferably 0.5 kPa or more. A gage pressure of less than 0.2 kPa is not preferred because the ambient air and moisture may enter into the recovery container, promoting decomposition of a crude polyacetal copolymer inside the recovery container, and in addition, the crude polyacetal copolymer may become more susceptible to oxidative decomposition due to the presence of oxygen and acid decomposition due to moisture in the melt-kneading section 7, and as a result, a high quality polyacetal copolymer may not be obtained.

The gage pressure inside the recovery container is preferably adjusted by charging an inert gas from the outlet 5, a location upstream of the recovery container or the vicinity thereof. Further, the inside of the recovery container is preferably maintained in a constantly pressurized state with an inert gas to prevent contamination of the ambient air so that absorption of moisture by a crude polyacetal resin can be controlled.

Due to the presence of a catalyst of a nonvolatile protonic acid, a crude polyacetal resin received in the recovery container is very unstable until the catalyst is completely deactivated, and even a small amount of moisture contamination will promote decomposition of the crude polyacetal resin. In particular, moisture contamination inside the recovery container is not preferred. Therefore, the outlet 5 of the mixing section 3 (a polymerization reaction apparatus), the recovery container of a crude polymer and a conduit from the outlet 5 through the recovery container are preferably managed in the presence of an inert gas. An inert gas may be introduced directly into the recovery container, or may be supplied through a conduit upstream of the container, a discharge port of the polymerization apparatus or the vicinity thereof.

There is no particular limitation for the inert gas, but nitrogen and argon are commonly used, and in particular nitrogen is preferably used. In a case where a degassing line is further provided, the inside of the recovery container may be susceptible to decompression. Therefore, the internal pressure is preferably checked at all times with a pressure gage.

<(S1) Raw Material-Introducing Step>

Next, the raw material-introducing step (S1) will be described. The raw material-introducing step includes introducing a raw material comprising a trioxane, a comonomer copolymerizable with the trioxane and a nonvolatile protonic acid to the aforementioned polyacetal copolymer manufacturing apparatus 1. Note that for easy understanding, FIG. 1 describes that a mixture of all components of the raw material is introduced through the inlet 2, but there is no particular limitation for the way of introduction as long as all components of the raw material are eventually introduced through the inlet 2.

[Main Monomer]

Trioxane (1,3,5-trioxane) may be used as a main monomer. Trioxane may be obtained when 3 molecules of formaldehyde are bonded together by an action of an acid.

[Comonomer]

A compound selected from cyclic ethers and formals each having at least one carbon-carbon bond may be used as a comonomer. Representative examples of the compound used as a comonomer may include, for example, 1,3-dioxolane, diethylene glycol formal, 1,4-butanediol formal, 1,3-dioxane, ethyleneoxide, propylene oxide, epichlorohydrin and the like. Among these, in view of the stability of polymerization, preferred are 1,3-dioxolane, diethylene glycol formal, 1,4-butanediol formal, 1,3-dioxane, ethylene oxide and the like. Further, a cyclic ester, for example, β-propiolactone; a vinyl compound, for example, styrene; and the like may also be used. Moreover, monofunctional cyclic ethers and formals each having a substituent unit, such as butyl glycidyl ether, 2-ethylhexyl glycidyl ether can be used as a comonomer. Furthermore, the followings may also be used as a comonomer: a compound having two polymerizable cyclic ether or formal groups such as a diglycidyl ether and diformal of alkylene glycol, for example, butanediol dimethylidene glyceryl ether, butanediol diglycidyl ether and the like; a compound having three or more polymerizable cyclic ether or formal groups, such as glycerol triglycidyl ether, trimethylolpropane triglycidyl ether and pentaerythritol tetraglycidyl ether. Polyacetal copolymers in which branching structures and cross-linked structures are formed by this also fall within the scope of the present invention.

According to the present invention, the amount of a compound used as a comonomer which is selected from cyclic ethers and formals is 0.1 to 20 mol % relative to the total monomers (the total amount of trioxane as a main monomer and a comonomer), and preferably 0.2 to 10 mol %. An amount of less than 0.1 mol % is not preferred because the amount of the unstable terminal ends of a crude polyacetal copolymer generated by polymerization is increased, resulting in decreased stability. On the other hand, an excessive amount of a comonomer is not preferred because the resulting copolymer is softened, resulting in a decreased melting point.

In the present invention, when polymerizing the main monomer and the comonomer described above to prepare a polyacetal copolymer, a known chain transfer agent, for example, a low molecular weight linear acetal such as methylal can be added to control the degree of polymerization.

Further, a polymerization reaction is preferably performed essentially in the absence of impurities containing active hydrogen, for example, water, methanol and formic acid. For example, it is preferably performed under conditions where impurities are each present in an amount of 10 ppm or less. To this end, trioxane and a cyclic ether and/or formal which have been prepared so as to minimize these impurity components as much as possible are preferably used as a main monomer and a comonomer.

[Nonvolatile Protonic Acids]

In the present invention, a nonvolatile protonic acid serves as a polymerization catalyst. According to the present invention, a nonvolatile protonic acid is used as a polymerization catalyst instead of a boron trifluoride-based catalyst. Therefore, the polymerization conversion percentage can be increased as compared with a case where a boron trifluoride-based catalyst is used as a polymerization catalyst.

Examples of the nonvolatile protonic acid may include compounds comprising at least one selected from heteropolyacids, isopolyacids or acid salts thereof. A heteropolyacid refers to a polyacid which may be generated by subjecting different oxygen acids to dehydration-condensation, and has a specific heteroelement present at the center and a mono- or bi-nuclear complex ion which may be created when condensable acid groups are condensed by sharing an oxygen atom. An isopolyacid, which is also referred to as an isopolyacid, a homonuclear condensed acid or a homopolyacid, refers to a high molecular weight inorganic oxygen acid comprising a condensation product of an inorganic oxygen acid having a single kind of V or VI-valent metal.

[Heteropolyacid or Acid Salt Thereof]

First, a heteropolyacid or an acid salt thereof will be described in detail. A heteropolyacid or an acid salt thereof can be represented by the general formula (1):

$$H_x[M_m \cdot M'_n O_l] \cdot yH_2O \qquad (1)$$

A heteropolyacid in which the central element M in the above composition formula represents at least one element selected from P and/or Si, and the coordinating element M' represents one or more elements selected from W, Mo and V is particularly effective as a polymerization catalyst for use in the present invention. In view of the polymerization activity, the coordinating element M' is more preferably W or Mo. Further, in the general formula (1), l is 10 to 100, and m is 1 to 10, and n is 6 to 40, and x is 1 or more, and y is 0 to 50.

Moreover, acid salts in which $H_x$ in the general formula (1) is replaced with various metals and the like may also be used as catalysts for use in the present invention.

Specific examples of the heteropolyacid may include, for example, phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstentovanadic acid and the like. In particular, in view of the polymerization activity, the heteropolyacid is preferably selected from silicomolybdic acid, silicotungstic acid, phosphomolybdic acid and phosphotungstic acid.

Further, the α0, βII and βIV types of heteropolyacids are generally known, and in view of the polymerization activity, the α0 and βIV types are preferred, and the α0 type is particularly preferred.

[Isopolyacid or Acid Salt Thereof]

Next, isopolyacids or acid salts thereof will be described in detail. Isopolyacids or acid salts thereof can be represented by the general formula (2) or (3):

$$xM_2^I O \cdot pM_2^{VI} O_6 \cdot yH_2O \qquad (2)$$

$$xM_2^I O \cdot pM_2^{VI} O_6 \cdot yH_2O \qquad (3)$$

wherein in the general formulas (2) and (3), $M^I$ represents hydrogen optionally replaced with a metal in some occurrences. $M^V$ represents one or more elements selected from V, Nb and Ta of the V group in the periodic table. $M^{VI}$ represents one or more elements selected from Cr, Mo, W and U of the VI group in the periodic table.

p and x are 1 or more, and y is 0 to 50.

An isopolyacid may be prepared by various methods such as a method in which a solution of an isopolyacid salt is treated with an ion exchange resin and a method in which a mineral acid is added to a concentrated solution of an isopolyacid salt, and then ether extraction is performed. Note that in the present invention, not only an isopolyacid but also an acid salt of an isopolyacid can be used as a polymerization catalyst. Any isopolyacid salt represented by the above general formula (2), (3) may be used, but in view of the polymerization activity, an isopolyacid represented by the general formula (3) or an acid salt thereof is preferred.

Specific examples of a preferred isopolyacid may include isopolytungstic acid such as paratungstic acid, metatungstic acid; isopolymolybdic acid such as paramolybdic acid, metamolybdic acid; meta-polyvanadic acid, isopolyvanadic acid and the like. Among these, isopolytungstic acid is preferred in view of the polymerization activity.

[Solvent]

Preferably, a nonvolatile protonic acid is diluted with an inert solvent which does not show any deleterious effect on polymerization, and then added to trioxane and/or a comonomer in order to achieve a uniform polymerization reaction. Inert solvents may preferably include, but not limited to, esters obtainable by condensation of a low molecular weight carboxylic acid having 1 to 10 carbon atoms, such as formic acid, acetic acid, propionic acid and butyric acid and a low molecular weight alcohol having 1 to 10 carbon atoms, such as methanol, ethanol, 1-propanol, 2-propanol, 1-butanol, 2-butanol, 2-methyl-1-propanol, 2-methyl-2-propanol, 1-pentanol, 3-methyl-1-butanol and 1-hexanol; low molecular weight ketones having 1 to 10 carbon atoms such as acetone, 2-butanone, 2-pentanone, 3-pentanone, 2-hexanone, 3-hexanone, methyl isobutyl ketone and methyl-t-butyl ketone. Considering industrial availability and the like, methyl formate, ethyl formate, methyl acetate, ethyl acetate, butyl acetate, acetone, 2-butanone, methyl isobutyl ketone and the like are most suitable. A polymerization catalyst may be dissolved in the above inert solvent to a concentration of 1 to 30 weight/weight %, the concentration is not limited to that. Further, a method is also preferred in which a predetermined amount of a nonvolatile protonic acid is pre-mixed with any one or more of trioxane, a comonomer, a molecular weight modifier and the like in their partial or entire amounts, and the resulting solution is added to a polymerization system to perform polymerization.

There is no particular limitation for the amount of the polymerization catalyst, but it is preferably 0.1 ppm or more and 50 ppm or less relative to the total amount of entire monomers, and more preferably 0.1 ppm or more and 10 ppm or less.

A too small amount of the polymerization catalyst is not preferred because the content of unreacted trioxane remained in a crude polyacetal copolymer will be more than 1.0 part by weight, and a high polymerization yield cannot be obtained. Further, a content of unreacted trioxane remained in a crude polyacetal copolymer of more than 1.0 part by weight is not preferred because even after stabilizing unstable termini of the crude polyacetal copolymer, the thermal stability, the amount of released formaldehyde and the melt index of the stabilized polyacetal copolymer may be less than satisfactory. Moreover, the b value may also be high for the hue of pellets of the stabilized polyacetal copolymer.

On the other hand, a too large amount of the polymerization catalyst is not preferred because a decomposition reaction may proceed.

<Polymerization Reaction Step (S2)>

Next, the polymerization reaction step (S2) will be described. The polymerization reaction step (S2) includes performing a polymerization reaction of a raw material to obtain a reaction mixture.

There is no particular limitation for the method of polymerization, but for example, the approach described in Japanese Unexamined Patent Application Publication No. H11-302349 is suitably used. In this approach, trioxane, a comonomer and a nonvolatile protonic acid are thoroughly pre-mixed while assuring that they are in the liquid phase, and the resulting mixed liquid of raw materials for the reaction is then introduced to the polymerization apparatus 1 to perform a copolymerization reaction. According to this approach, the amount of a nonvolatile protonic acid as a catalyst can be reduced. This, as a result, is advantageous for obtaining a polyacetal copolymer with a less amount of formaldehyde released.

A polymerization environmental temperature as used herein refers to the ambient temperature of a monomer or a polymer, and corresponds to the temperature of a barrel and the like in the case of the reaction apparatus according to the present invention. In the early stage of polymerization, preferably, the polymerization environmental temperature is moderately decreased in order to reduce evaporation of a monomer due to the heat of polymerization generated in the early stage of polymerization. Because a monomer once evaporated in the early stage of polymerization is less polymerizable, the evaporation of the monomer needs to be reduced in order to achieve a high polymerization conversion percentage in the reaction apparatus. Therefore, the polymerization environmental temperature in the early stage of polymerization is preferably controlled at 100° C. or less until the conversation percentage reaches 50%.

The polymerization environmental temperature thereafter is preferably maintained in a temperature range of between 80° C. or more and 140° C. or less, more preferably maintained in a temperature range of between 100° C. or more and 140° C. or less, and even more preferably maintained in a temperature range of between 115° C. or more and 140° C. or less. In a case where the polymerization environmental temperature is too low, the content of unreacted trioxane contained in a crude polyacetal copolymer will be more than 1.0 part by weight, and thus a high polymerization yield cannot be obtained. Further, because the content of moisture in a crude polyacetal copolymer is more than 0.1 part by weight, and moisture may enter into the recovery container, decomposition of the crude polyacetal copolymer is promoted inside the recovery container, and in addition, the crude polyacetal copolymer becomes more susceptible to oxidative decomposition due to the presence of oxygen and acid decomposition due to moisture in the melt-kneading section 7, and as a result, a high quality polyacetal copolymer cannot be obtained.

Further, a too high polymerization temperature is not preferred because a decomposition reaction may be promoted.

In the present invention, when polymerizing the main monomer (a) and the comonomer (b) described above to prepare a polyacetal copolymer, a known chain transfer agent, for example, a low molecular weight linear acetal such as methylal can be added to control the degree of polymerization.

Further, the polymerization reaction is preferably performed essentially in the absence of impurities containing active hydrogen, for example, water, methanol and formic acid. For example, it is preferably performed under conditions where impurities are each present in an amount of 10 ppm or less. To this end, trioxane and a cyclic ether and/or formal which have been prepared so as to minimize these impurity components as much as possible are preferably used as a main monomer or a comonomer.

<Unreacted-Monomer Re-Introducing Step (S3)>

The unreacted monomer re-introducing step (S3) includes performing vapor separation of unreacted monomers from a reaction mixture, and re-introducing them to the polyacetal copolymer manufacturing apparatus 1.

[Vapor Separation of Unreacted Monomers]

There is no particular limitation for the environmental temperature when performing vapor separation of unreacted monomers, but it is preferably 115° C. or more and less than 140° C. In a case where the environmental temperature is too low, monomers may not be sufficiently recovered, decreasing the amount of monomers to be recovered from the reaction apparatus and the amount of monomers to be re-introduced into the reaction apparatus. As a result, the ratio by weight of a polyacetal copolymer to monomers newly introduced to the reactor becomes low. Therefore, the manufacturing process becomes inefficient, and economical efficiency is deteriorated. In addition, the excessive amount of monomers will remain in the resulting polyacetal copolymer, resulting in inferior economical efficiency and quality. In a case where the environmental temperature is too high, a decomposition reaction is promoted, and a polyacetal copolymer cannot efficiently be obtained.

The environmental temperature as used herein refers to the ambient temperature of a reaction mixture. In a case where the rear portion of a reaction machine having a barrel is used for this step, the temperature of the barrel is also taken as an environmental temperature.

There is no particular limitation for the approach of vapor separation, but the vapor separation of unreacted monomers is preferably performed in the vapor separating section 4 having a mechanism of decompression, aspiration or distribution of an inert-gas flow in view of that a nonvolatile protonic acid is highly active as a polymerization catalyst, and a high conversion percentage can be obtained in a short time, and further, the step is simple.

Note that any of the following methods can be used: a method comprising optionally preparing a polymerization apparatus having two or more stages, performing polymerization in a first stage of the apparatus until a predetermined conversion percentage is reached, and then transferring the content to a second stage to continue polymerization and simultaneously to vaporize and separate unreacted monomers; a method comprising simultaneously performing deactivation of a catalyst in the presence of a catalyst deactivating agent and vaporization removal of unreacted monomers; and the like. However, embodiments in any combination of other than these may be used.

[Re-Introducing Unreacted Monomers Into Polyacetal Copolymer Manufacturing Apparatus 1]

Subsequently, the unreacted monomers obtained by performing vapor separation from a reaction mixture are again introduced into the polyacetal copolymer manufacturing apparatus 1.

According to the conventional method, monomers unreacted in the late stage of a polymerization reaction are removed from a crude polymer in the subsequent steps of catalyst deactivation and washing, and separated and captured in a low concentration solution. Therefore, a large amount of energy is required for concentration and purification before they are re-introduced into the polymerization system. On the other hand, if unreacted monomers are not recovered, they suffer complete loss. Therefore, in either of the cases, a loss in the polymerization reaction is unavoidable.

In contrast, according to the present invention, unreacted monomers can be removed without performing steps of catalyst deactivation, washing and the like. Consequently, unreacted monomers can be re-introduced into the polyacetal copolymer manufacturing apparatus 1 after only performing a very simple purification treatment. This is allowed because the unreacted monomers do not contain a solvent and the like. Therefore, unreacted monomers will not be wasted in polymerization. That is, the total monomers C introduced to a polymerization machine consists of a monomer B recovered from a polymerization machine and directly re-introduced into the polymerization machine and a monomer A newly introduced (C=A+B). As a result, advantageously, the proportion of the resulting crude polymer to the newly introduced monomers is very high.

<Polyacetal Copolymer-Recovery Step (S4)>

The polyacetal copolymer-recovery step (S4) includes recovering a polyacetal copolymer from the above reaction mixture into the crude polyacetal copolymer recovery section 6 provided downstream of the outlet 5 and adjusted to a gage pressure of 0.2 kPa or more.

The inside of the crude polyacetal copolymer recovery section 6 is adjusted to a gage pressure of 0.2 kPa or more. A gage pressure of 0.2 kPa or more suffices for the purposes of the present invention, but it is preferably 0.5 kPa or more. A gage pressure of less than 0.2 kPa is not preferred because the ambient air and moisture may enter into the recovery container, promoting decomposition of a crude polyacetal copolymer inside the recovery container, and in addition, the crude polyacetal copolymer may become more susceptible to oxidative decomposition due to the presence of oxygen and acid decomposition due to moisture in the melt-kneading section 7, and as a result, a high quality polyacetal copolymer may not be obtained.

The gage pressure inside the recovery container is preferably adjusted by charging an inert gas from the outlet 5, a location upstream of the recovery container or the vicinity thereof. Further, the inside of the recovery container is preferably maintained in a constantly pressurized state with an inert gas to prevent contamination of the ambient air so that absorption of moisture by a crude polyacetal resin can be controlled.

Due to the presence of a nonvolatile protonic acid catalyst, a crude polyacetal resin received in the recovery container is very unstable until the catalyst is completely deactivated, and even a small amount of moisture contamination will promote decomposition of the crude polyacetal resin. In particular, moisture contamination inside the recovery container is not preferred. Therefore, the outlet 5 of the mixing section 3 (a polymerization reaction apparatus), the recovery container of a crude polymer and a conduit from the outlet 5 through the recovery container are preferably managed in the presence of an inert gas. An inert gas may be introduced directly into the recovery container, or may be supplied from a conduit upstream of the container, a discharge port of a polymerization apparatus or the vicinity thereof.

There is no particular limitation for the inert gas, but nitrogen and argon are commonly used, and in particular nitrogen is preferably used. In a case where a degassing line is provided, the inside of the recovery container may be susceptible to decompression. Therefore, the internal pressure is preferably checked at all times with a pressure gage.

The content of moisture in a crude polyacetal resin received in the recovery container is preferably maintained at 0.1 parts by weight or less, and more preferably maintained at 0.05 parts by weight or less. A content of moisture of more than 0.1 parts by weight is not preferred because the crude polyacetal resin becomes susceptible to decomposition, and further, a high quality polyacetal copolymer cannot be obtained at the deactivation step (S5).

Approaches for evaluating the content of moisture include those in which a crude polyacetal resin is sampled through an outlet at a manhole and the like provided in a tank of the recovery container, and transferred to a moisture measurement instrument for measurements such that exposure to the ambient air is avoided as much as possible. Examples of a moisture measurement instrument include a moisture meter equipped with a heating vaporization unit.

<Deactivation Step (S5)>

Next, the deactivation step (S5) will be described. The step includes adding a basic compound to the polyacetal copolymer recovered at the polyacetal copolymer-recovery step, and performing melt-kneading treatment to deactivate the nonvolatile protonic acid.

[Basic Compound]

There is no particular limitation for the basic compound, but the basic compound preferably comprises at least one selected from triazine ring-containing compounds having amino groups or substituted amino groups, carbonate, hydrogencarbonate or carboxylate salts of alkali metal elements or alkali earth metal elements or hydrates thereof in view of that the basic compound may be added directly to the crude polyacetal copolymer without washing the crude polyacetal copolymer to deactivate the polymerization catalyst and also to stabilize unstable termini of the crude polyacetal copolymer. Further, the carbonate, hydrogencarbonate or carboxylate salt of an alkali metal element or an alkali earth metal element or a hydrate thereof preferably comprises at least one selected from sodium formate, sodium acetate, sodium carbonate, sodium hydrogencarbonate, disodium succinate, sodium laurate, sodium palmitate, sodium stearate or calcium stearate.

The above triazine ring-containing compounds having amino groups or substituted amino groups may preferably include melamine, melamine resin, CTU guanamine (3,9-bis[2-(3,5-diamino-2,4,6-triazaphenyl)ethyl]-2,4,8,10-tetraoxaspiro[5,5]undecane), CMTU guanamine (3,9-bis[1-(3,5-diamino-2,4,6-triazaphenyl)methyl]-2,4,8,10-tetraoxaspiro[5,5]undecane) and the like.

Further, the basic compounds are preferably any of carbonate, hydrogencarbonate, aliphatic carboxylate, unsaturated aliphatic carboxylate or aromatic carboxylate salts of alkali metal elements or alkali earth metal elements or hydrates thereof. Specifically, they may include, but not limited to, lithium carbonate, anhydrous sodium carbonate, sodium carbonate monohydrate, sodium carbonate decahydrate, potassium carbonate, rubidium carbonate, cesium carbonate, magnesium carbonate, calcium carbonate, barium carbonate, lithium hydrogencarbonate, sodium hydrogencarbonate, potassium hydrogencarbonate, cesium hydrogencarbonate, lithium formate monohydrate, sodium formate, potassium formate, rubidium formate, cesium formate, magnesium formate, calcium formate, barium formate, lithium acetate, sodium acetate, sodium acetate trihydrate, potassium acetate, rubidium acetate, cesium acetate, magnesium acetate, calcium acetate monohydrate, magnesium acetate tetrahydrate, barium acetate, sodium laurate, potassium laurate, lithium palmitate, sodium palmitate, potassium palmitate, magnesium palmitate, calcium palmitate, lithium stearate, sodium stearate, potassium stearate, magnesium stearate, calcium stearate, sodium gluconate, potassium gluconate, lithium lactate, sodium lactate, potassium lactate, lithium oxalate, sodium oxalate, potassium oxalate monohydrate, lithium succinate, monosodium succinate, disodium succinate, disodium succinate hexahydrate, dipotassium succinate, disodium adipate, dipotassium adipate, sodium gluconate, potassium gluconate, lithium lactate, sodium lactate, potassium lactate, disodium malate 1/2 hydrate, disodium malate trihydrate, dilithium tartrate monohydrate, disodium tartrate dihydrate, potassium hydrogen tartrate, dipotassium tartrate, potassium sodium tartrate tetrahydrate, sodium rubidium tartrate, lithium citrate tetrahydrate, monosodium citrate, disodium citrate, trisodium citrate, trisodium citrate dihydrate, sodium aspartate monohydrate, disodium glutamate monohydrate, sodium acrylate, potassium acrylate, sodium sorbate, potassium sorbate, monosodium fumarate, lithium benzoate, sodium benzoate, potassium benzoate, cesium benzoate, potassium hydrogen phthalate, lithium salicylate monohydrate, sodium salicylate, potassium salicylate and the like.

Considering industrial availability and the like, the basic compounds are preferably lithium carbonate, anhydrous sodium carbonate, sodium carbonate monohydrate, sodium carbonate decahydrate, potassium carbonate, magnesium carbonate, calcium carbonate, barium carbonate, lithium hydrogencarbonate, sodium hydrogencarbonate, potassium hydrogencarbonate, lithium formate monohydrate, sodium formate, potassium formate, magnesium formate, calcium formate, barium formate, lithium acetate, sodium acetate, sodium acetate trihydrate, potassium acetate, calcium acetate monohydrate, magnesium acetate tetrahydrate, barium acetate, sodium laurate, potassium laurate, sodium palmitate, potassium palmitate, lithium stearate, sodium stearate, potassium stearate, magnesium stearate, calcium stearate, monosodium succinate, disodium succinate, disodium succinate hexahydrate, dipotassium succinate, lithium citrate tetrahydrate, monosodium citrate, trisodium citrate, trisodium citrate dihydrate, sodium aspartate monohydrate, disodium glutamate, sodium acrylate, potassium acrylate, sodium sorbate, potassium sorbate, monosodium fumarate, lithium benzoate, sodium benzoate, potassium benzoate, potassium hydrogen phthalate, lithium salicylate monohydrate, sodium salicylate, potassium salicylate.

Further, considering the hue of the polyacetal copolymer after deactivating the polymerization catalyst, the basic compounds are more preferably sodium formate, sodium acetate, anhydrous sodium carbonate, sodium carbonate monohydrate, sodium carbonate decahydrate, sodium hydrogencarbonate, disodium succinate hexahydrate, sodium laurate, sodium palmitate, sodium stearate and the like.

In the present invention, the basic compounds may be used alone or in combination of two or more, and may even be in forms of mixtures and double salts thereof. Examples of a double salt may include sodium sesquicarbonate consisting of sodium carbonate and sodium hydrogencarbonate.

There is no particular limitation for the contents of the basic compounds, but preferably, the contents are appropriately adjusted depending on (i) the amount of a catalyst remained in a polymer, (ii) the types and amounts of unstable terminal groups generated under polymerization conditions, (iii) the degree of the activities of the basic compounds and treatment conditions (temperature, time, contact velocity and the like) and the like. Specifically, the contents of the basic compounds are preferably very small, preferably 0.002 to 700 milli-equivalents relative to 1 kg of a crude polyacetal copolymer obtained from a copolymerization reaction.

In a case where the contents of the basic compounds are 1.0 or less milli-equivalent relative to 1 kg of a crude polyacetal copolymer, a value of 2.0 or less can be achieved for the b value of a polyacetal copolymer after deactivation of a polymerization catalyst.

Excessive contents of the basic compounds are not preferred because the hue of a polyacetal copolymer after deactivating a polymerization catalyst may be deteriorated. Too small contents of the basic compounds are also not preferred because the efficiency of deactivation or the stabilization of unstable terminal ends may not be sufficiently achieved.

When at least one of the basic compounds is added as described above, the trace amount of the at least one of the basic compounds suffices for uniform dispersion throughout it. As a result, a value of 2.0 or less as measured with a color difference meter can be achieved for the b value of a polyacetal copolymer after deactivation of a polymerization catalyst. Note that the b value used herein is measured using a color difference meter SE-2000 (Nippon Denshoku Industries Co., Ltd.) as follows: a predetermined amount of pellets are placed in a pellet measurement cell (a round cell), and mounted on a sample stage, and covered with a cover to read a displayed value.

[Melt-Kneading of Crude Polyacetal Copolymer and Basic Compound]

There is no particular limitation for the melt-kneading processing machine, but it is preferably one having a function of kneading a molten copolymer and preferably a venting function. Examples include single-axis or multi-axes continuous extruder-kneaders and co-kneaders each having at least one venting hole. According to the present invention, the polymerization catalyst is completely deactivated, and unstable terminal ends are reduced and stabilized in the melt-kneading treatment.

The melt-kneading treatment is preferably performed in a temperature range of from the melting point of a copolymer to 260° C. A temperature of higher than 260° C. is not preferred because a polymer may be deteriorated and decomposed.

In the present invention, the aforementioned melt-kneading treatment is preferably performed in the presence of an antioxidizing agent. As an antioxidizing agent, materials known as stabilizers for conventional polyacetal resins, for example, various types of hindered phenol antioxidizing agents and the like may be used. Representative examples include 2,6-di-t-butyl-4-methyl phenol, triethyleneglycol-bis[3-(3-t-butyl-5-methyl-4-hydroxyphenyl)propionate], 1,6-hexanediol-bis-[3-(3,5-di-t-butyl-4-hydroxyphenyl)propionate], tetrakis[3-(3,5-di-t-butyl-4-hydroxyphenyl)propionate]methane, N,N'-hexamethylenebis(3,5-di-t-butyl-4-hydroxyhydrocinamido), 2-t-butyl-6-(3'-t-butyl-5'-methyl-2'-hydroxybenzyl)-4-methylphenyl acrylate, 3,9-bis[2-{(3-t-butyl-4-hydroxy-5-methylphenyl)propionyloxy}-1,1'-dimethylethyl]-2,4,8,10-tetraoxaspiro[5,5]-undecane and the like. Note that these hindered phenol antioxidizing agents may be pre-added in a partial or entire amount to a main monomer or a comonomer before polymerization, and then polymerization may be performed. Further, these hindered phenol antioxidizing agents do not cause any deleterious effect on the activity of a polymerization catalyst unless they are not added in particularly excessive amounts. This is a preferred embodiment.

Further, any of materials known as stabilizers for various polyacetal resins may be added at this stage without causing any problem. Furthermore, for example, an inorganic filler such as glass fiber, a crystallization promoter (a nucleating additive), a parting agent, an anti-oxidant may be added.

As described above, at least one of the basic compounds is added as a deactivating/stabilizing agent to a crude copolymer. After performing melt-kneading treatment, a formaldehyde gas generated due to decomposition, unreacted monomers and oligomers, the deactivating/stabilizing agent and the like are usually removed from an extruder through a vent part under reduced pressure to form pellets and the like, thereby obtaining a product for resin processing. Pellets are dried if desired. If drying is desired, they are dried at 135° C. for about 4 hours.

EXAMPLES

Below, the present invention will be specifically described with reference to Examples, but the present invention shall not be limited to these.

TABLE 1

| | | Example | | | | | | | |
|---|---|---|---|---|---|---|---|---|---|
| | | 1 | 2 | 3 | 4 | 5 | 6 | 7 | 8 |
| Feeding/Polymerization reaction | Comonomer | DOXO | DOXO | DOXO | DOXO | DOXO | DOXO | DOXO | DOXP |
| | Polymerization catalyst | HPA | HPA | HPA | HPA | IPA | HPA | IPA | HPA |
| | Amount of polymerization catalyst (ppm) | 2 | 2 | 2 | 2 | 4 | 2 | 4 | 2 |
| Recovery | Gage pressure in recovery container (kPa) | 0.25 | 0.5 | 0.5 | 0.5 | 0.5 | 0.5 | 0.5 | 0.5 |
| Deactivation | Basic compound (Deactivating agent) | A | A | A | B | B | C | C | C |
| | Amount of basic compound (ppm) | 500 | 500 | 700 | 10 | 10 | 10 | 10 | 10 |

TABLE 2

| | | Comparative Example | | | | |
|---|---|---|---|---|---|---|
| | | 1 | 2 | 3 | 4 | 5 |
| Feeding/Polymerization reaction | Comonomer | DOXO | DOXO | DOXO | DOXO | DOXO |
| | Polymerization catalyst | HPA | HPA | HPA | BF$_3$ | BF$_3$ |
| | Amount of polymerization catalyst (ppm) | 2 | 2 | 2 | 20 | 20 |
| Recovery | Gage pressure in recovery container (kPa) | 0 | −0.2 | −0.2 | 0 | −0.2 |
| Deactivation | Basic compound (Deactivating agent) | A | A | B | A | A |
| | Amount of basic compound (ppm) | 500 | 500 | 10 | 500 | 500 |

The abbreviations or symbols shown in Tables 1 and 2 are as follows.

(Comonomers)
DOXO: 1,3-dioxolane
DOXP: 1,3-dioxepane
(Polymerization catalysts)
HPA: Phosphomolybdic acid (a nonvolatile protonic acid)
IPA: Paratungstic acid (a nonvolatile protonic acid)
BF$_3$: Boron trifluoride (a dibutyl ether complex) (a conventionally known polymerization catalyst)
(Basic compounds)
A: Melamine
B: Sodium carbonate
C: Sodium stearate Example and Comparative Example In the mixing section 3 shown in FIG. 1, two rotational axes having a large number of agitation and propulsion paddles attached in the inside thereof are provided along the longitudinal direction. Copolymerization was performed as follows: while passing a heating medium through the jacket of the mixing section 3, and rotating the two rotational axes at a certain rate at an environmental temperature of 115° C. or more and 140° C. or less, a mixed liquid comprising 96.2 wt % of trioxane containing 3.0 wt % of a comonomer shown in Table 1 and 1000 ppm of methylal as a molecular weight modifier and 3.8 wt % of a comonomer shown in Tables 1 and 2 was continuously introduced through the inlet 2, and at the same time, a solution of methyl formate containing 0.3 wt % of a heteropolyacid shown in Tables 1 and 2 as a polymerization catalyst was continuously added to the mixed liquid in an amount shown in Table 1 relative to the total monomers. The addition amounts of polymerization catalysts in Tables 1 and 2 are expressed in terms of ratios by weight (unit: ppm) relative to the sum of the total monomers.

Subsequently, unreacted monomers are vaporized from the vapor separating section 4, and separated and removed from the reaction system, and directed to and captured in a condenser (not shown), and then re-introduced into the reaction apparatus 1 through the inlet 2 along with a newly introduced monomer. At the same time, the reaction product from copolymerization (a crude polyacetal copolymer) was passed through a sieve having an opening of 11.2 mm, and the crude polyacetal copolymer passed through the sieve was withdrawn from the outlet 5. Then, the crude polyacetal copolymers withdrawn from the outlet 5 was collected at the crude polyacetal copolymer recovery section 6 located downstream of the outlet 5.

In Examples 1 to 8, nitrogen was introduced as an inert gas through a valve located upstream of the crude polyacetal copolymer recovery section 6 such that the pressure inside the recovery container was controlled to be a gage pressure shown in Table 1. Meanwhile, in Comparative Examples 1 and 4, nitrogen was only allowed to flow so as to achieve a pressure substantially similar to the atmospheric pressure. In Comparative Examples 2, 3 and 5, the system was operated under a reduced pressure created by aspiration of air through an exhaust air duct without flowing nitrogen to the recovery container.

Then, a basic compound shown in Tables 1 and 2 was added in order to deactivate the catalyst contained in the crude polyacetal copolymer recovered at the crude polyacetal copolymer recovery section 6. The addition amounts of polymerization catalysts in Tables 1 and 2 are expressed in terms of ratios by weight (unit: ppm) relative to the sum of the total monomers.

Subsequently, 0.3 wt % of triethylene glycol bis[3-(3-t-butyl-5-methyl-4-hydroxyphenol)propionate] was added as an antioxidizing agent, and melt-kneading and extrusion were performed using a biaxial extruder with a vent at 220° C. under a degree of vacuum of 5 mmHg at the vent part to prepare each of the polyacetal copolymers according to Examples and Comparative Examples.

<Evaluation>

For each of Examples and Comparative Examples, measured were the content of moisture in a crude polyacetal copolymer recovered in the recovery container, the amount of trioxane and the proportion of the group of particles each having a particle diameter of 11.2 mm or less contained in the groups of particles of the crude polyacetal copolymer. Pellets of the polyacetal copolymer obtained by deactivating a catalyst contained in a crude polyacetal copolymer, and then melt-kneading and extruding the polyacetal copolymer after deactivation with a biaxial extruder were dried under conditions of at 135° C. and for 4 hours. Then, the melt index (MI), the rate of alkali decomposition, the amount of released formaldehyde and the hue of the polyacetal copolymer after deactivation of the polymerization catalyst were measured.

[Crude Polyacetal Copolymer]
[Evaluation of Water Content Contained in Crude Polyacetal Copolymer]

The contents of water contained in crude copolymers were quantified when measured under conditions of nitrogen flow at 300 mL/min at 100° C. with a Karl-Fisher moisture meter CA-200 (Mitsubishi Chemical Analytech Co., Ltd.) using 1.0 g of samples from Examples and Comparative Examples. Results are shown in Tables 3 and 4.

[Evaluation of Trioxane Content Contained in Crude Polyacetal Copolymer]

The amounts of trioxane were evaluated with a gas chromatography system GC-2014ATF (Shimadzu Corporation). For each of 40 g samples according to Examples and Comparative Examples was placed and sealed in a cylinder along with 20 mL of distilled water, and heated on an oil bath under conditions of 100° C. and for 4 hours to extract trioxane. Then, the amount of trioxane contained in a crude copolymer was quantified as measured with the gas chromatography system. Results are shown in Tables 3 and 4.

[Proportion of the Group of Particles Each Having a Particle Diameter of 11.2 mm or Less Contained in the Groups of Particles Contained a Crude Polyacetal Copolymer]

Samples according to Examples and Comparative Examples were each screened with a sieve having an opening of 11.2 mm to determine a through-sieve proportion relative to 100 parts by weight of a corresponding sample. Results are shown in Tables 3 and 4.

[Pellets of Polyacetal Copolymer]
[Evaluation of Melt Index (MI)]

The polymerization catalyst-deactivated polyacetal copolymers according to Examples and Comparative Examples were each subjected to measurements with a melt-index measuring device Melt Indexer model L202 (Takara Thermistor Co. Ltd.) with a load of 2.16 kg at a temperature of 190° C. to obtain a melt index (g/10 min.). Results are shown in Tables 3 and 4. In the present Examples, the melt index (MI) was interpreted as a characteristic value reflecting a molecular weight. That is, it was read as a lower MI means a higher molecular weight and vice versa.

[Evaluation of Amount of Released Formaldehyde]

The polymerization catalyst-deactivated polyacetal copolymers according to Examples and Comparative Examples were each charged into a cylinder maintained at 200° C., and allowed to melt for 5 minutes. The molten material was then extruded from the cylinder into a closed container. Nitrogen gas was allowed to flow through the closed container, and formaldehyde contained in a flow-through nitrogen gas was dissolved and captured in water. Then the concentration of formaldehyde in water was measured to obtain the weight of formaldehyde released from the molten material. The weight of formaldehyde obtained above was divided by the weight of the molten material, thereby obtaining the amount of released formaldehyde (unit, ppm). Results are shown in Tables 3 and 4.

[Evaluation of Hue of Pellets]

The b values were measured as follows using a color difference meter SE-2000 (Nippon Denshoku Industries Co., Ltd.): predetermined amounts of pellets of the polymerization catalyst-deactivated polyacetal copolymers according to Examples and Comparative Examples were each placed in a pellet measurement cell (a round cell), and mounted on a sample stage, and covered with a cover to read a displayed b value. Results are shown in Tables 3 and 4.

TABLE 3

|  |  | Example | | | | | | | |
|---|---|---|---|---|---|---|---|---|---|
|  |  | 1 | 2 | 3 | 4 | 5 | 6 | 7 | 8 |
| Crude POM | Moisture content (Parts by weight) | 0.03 | 0.01 | 0.01 | 0.01 | 0.01 | 0.01 | 0.01 | 0.01 |
|  | Trioxane content (Parts by weight) | 0.5 | 0.4 | 0.4 | 0.4 | 0.4 | 0.4 | 0.4 | 0.4 |
|  | Particle diameter of 11.2 mm or less (Parts by weight) | 95 | 95 | 95 | 95 | 94 | 95 | 94 | 95 |
| Extruded pellets | Melt index | 9.1 | 8.9 | 9.1 | 9.3 | 9.9 | 8.9 | 9.5 | 9.3 |
|  | HCHO Amount of released HCHO (ppm) | 90 | 79 | 75 | 28 | 45 | 32 | 50 | 35 |
|  | Hue (b value) | 0.3 | −0.2 | 0.1 | −0.4 | 0.2 | −0.3 | 0.2 | −0.1 |

TABLE 4

|  |  | Comparative Example | | | | |
|---|---|---|---|---|---|---|
|  |  | 1 | 2 | 3 | 4 | 5 |
| Crude POM | Moisture content (Parts by weight) | 0.21 | 0.55 | 0.53 | 0.24 | 0.6 |
|  | Trioxane content (Parts by weight) | 1.5 | 1.8 | 1.8 | 1.5 | 1.9 |
|  | Particle diameter of 11.2 mm or less (Parts by weight) | 95 | 94 | 94 | 91 | 91 |
| Extruded pellets | Melt index | 12.3 | 14.0 | 13.7 | 12.9 | 15.9 |
|  | HCHO Amount of released HCHO (ppm) | 265 | 332 | 205 | 280 | 530 |
|  | Hue (b value) | 2.8 | 3.3 | 3.2 | 3.5 | 4.2 |

Because a polymerization catalyst used in the present invention is a nonvolatile protonic acid, a high polymerization yield can be obtained even in extremely small quantity of it. Further, decomposition of the crude polyacetal copolymer can be prevented because a recovery line via the recovery container located downstream of the outlet 5 of the mixing section 3 through the melt-kneading section 7 and the inside of the recovery container are isolated from the ambient air in the presence of an inert gas and protected from contamination such as moisture.

In addition, the content of moisture contained in the crude polyacetal copolymer will be 0.1 wt % or less because the crude polyacetal copolymer is maintained in a pressurized state along with an inert gas inside the recovery container. Because a less moisturized crude polyacetal copolymer is then melt-kneaded with a basic compound in the presence of an inert gas even in the subsequent deactivation step, not only efficient deactivation of a catalyst but also prevention of oxidative degradation can be achieved. Therefore, an extremely high quality polyacetal copolymer releasing only a small amount of formaldehyde can be provided as a commercial product (Examples 1 to 8).

In contrast, in a case where the pressure in the recovery container is insufficient, the content of unreacted trioxane of 1.0 part by weight or less cannot be achieved for the crude polyacetal copolymer, and further, the content of moisture of 0.1 parts by weight cannot be achieved. As a result, even in a case where a basic compound is added to the crude polyacetal copolymer to stabilize unstable termini, a value of the melt index is 10.0 g/10 min or more, and the b value of pellets is 2.0 or more. Further, the amount of released formaldehyde cannot meet a satisfactory quality level (Comparative Examples 1 and 4). This can be explained if the ambient air and moisture entered into the recovery container, promoting decomposition of the crude polyacetal copolymer inside the recovery container, and in addition, the polyacetal copolymer underwent oxidative decomposition due to the presence of oxygen and acid decomposition due to moisture in the melt-kneading section 7, and as a result, a high quality polyacetal copolymer was not obtained.

According to the method of manufacturing of the present invention, a polyacetal copolymer suitable for the subsequent steps can be obtained via a simply and energetically advantageous process as compared with the conventional method.

EXPLANATION OF REFERENCE NUMERALS

1 Polyacetal copolymer manufacturing apparatus
2 Inlet
3 Mixing section
4 Vapor separating section
5 Outlet
6 Crude polyacetal copolymer recovery section
7 Kneading apparatus

The invention claimed is:

1. A method of manufacturing a polyacetal copolymer, the method comprising: a raw material-introducing step of introducing a raw material comprising a trioxane, a comonomer copolymerizable with the trioxane and a nonvolatile protonic acid to a reaction apparatus of continuous stirring mixer-type having two parallel axes rotating in the same direction or in different directions relative to each other, a large number of paddles attached on each of the axes and a barrel located close to the outer peripheries of the paddles, wherein ends of long axes of the paddles are configured to periodically approach ends of short axes of their counterparts, and the raw material is to be introduced through an inlet provided at one end in the axial direction, and a reaction mixture and unreacted monomers are to be withdrawn through an outlet provided at the other end;
  a polymerization reaction step of performing a polymerization reaction of the raw material to obtain the reaction mixture;
  an unreacted-monomer re-introducing step of performing vapor separation of the unreacted monomers from the reaction mixture, and supplying the unreacted monomers to the raw material-introducing step;
  a polyacetal copolymer-recovery step of recovering a polyacetal copolymer from the reaction mixture into a recovery section provided downstream of the outlet and adjusted to a gage pressure of 0.2 kPa or more; and
  a deactivation step of adding a basic compound to the polyacetal copolymer recovered at the polyacetal copolymer-recovery step, and performing melt-kneading treatment to deactivate the nonvolatile protonic acid.

2. The method of manufacturing a polyacetal copolymer according to claim 1, wherein the gage pressure is adjusted by charging an inert gas from the outlet, a location upstream of the recovery section or the vicinity thereof.

3. The method of manufacturing a polyacetal copolymer according to claim 1, wherein the content of moisture contained in the polyacetal copolymer recovered at the polyacetal copolymer-recovery step is 0.1 parts by weight or less relative to 100 parts by weight of the polyacetal copolymer.

4. The method of manufacturing a polyacetal copolymer according to claim 1, wherein the content of unreacted trioxane contained in the polyacetal copolymer recovered at the polyacetal copolymer-recovery step is 1.0 part by weight or less relative to 100 parts by weight of the polyacetal copolymer.

5. The method of manufacturing a polyacetal copolymer according claim 1, wherein the nonvolatile protonic acid comprises at least one selected from the group consisting of heteropolyacids, isopolyacids, and acid salts thereof.

6. The method of manufacturing a polyacetal copolymer according to claim 5, wherein the nonvolatile protonic acid comprises a heteropolyacid represented by the following general formula (1) or an acid salt thereof:

$$H_x[M_m \cdot M'_n O_l] \cdot yH_2O \text{ tm } (1),$$

wherein in the general formula (1), M represents a central element selected from the group consisting of P and/or Si, and M' represents one or more coordinating elements selected from the group consisting of W, Mo and V; and l is 10 to 100, and m is 1 to 10, and n is 6 to 40, and x is 1 or more, and y is 0 to 50.

7. The method of manufacturing a polyacetal copolymer according to claim 5, the heteropolyacid or an acid salt thereof comprises at least one compound selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

8. The method of manufacturing a polyacetal copolymer according to claim 5, wherein the nonvolatile protonic acid comprises an isopolyacid represented by the following general formula (2) or (3) or an acid salt thereof:

(2)

(3)

wherein in the general formulas (2) and (3), $M^I$ represents hydrogen optionally replaced with a metal in some occurrences;

$M^V$ represents one or more elements selected from the group consisting of V, Nb and Ta of the V group in the periodic table;

$M^{VI}$ represents one or more elements selected from the group consisting of Cr, Mo, W and U of the VI group in the periodic table; and p and x are 1 or more, and y is 0 to 50.

9. The method of manufacturing a polyacetal copolymer according to claim 5, wherein the isopolyacid or an acid salt thereof comprises at least one compound selected from the group consisting of paratungstic acid, metatungstic acid, paramolybdic acid, metamolybdic acid, paravanadic acid, metavanadic acid and acid salts thereof.

10. The method of manufacturing a polyacetal copolymer according to claim 1, wherein the comonomer comprises at least one selected from the group consisting of 1, 3-dioxolane, diethylene glycol formal, 1, 4-butanediol formal and ethylene oxide.

11. The method of manufacturing a polyacetal copolymer according claim 1, wherein the basic compound comprises at least one selected from the group consisting of triazine ring-containing compounds having amino groups or substituted amino groups; carbonate, hydrogencarbonate or carboxylate salts of alkali metal elements or alkali earth metal elements and hydrates thereof.

12. The method of manufacturing a polyacetal copolymer according to claim 11, wherein the carbonate, hydrogencarbonate or carboxylate salt of an alkali metal element or an alkali earth metal element or a hydrate thereof comprises at least one selected from the group consisting of sodium formate, sodium acetate, sodium carbonate, sodium hydrogen carbonate, disodium succinate, sodium laurate, sodium palmitate, sodium stearate and calcium stearate.

13. The method of manufacturing a polyacetal copolymer according to claim 1, wherein the polyacetal copolymer after deactivation of the nonvolatile protonic acid at the deactivation step has
a melt index of the polyacetal copolymer of 10 g/10 min or less as measured at 190° C. with a load of 2160 g,
an amount of formaldehyde generated from the polyacetal copolymer of 100 ppm or less, and
a b value of the polyacetal copolymer of 2.0 or less as measured with a color-difference meter.

* * * * *

UNITED STATES PATENT AND TRADEMARK OFFICE
CERTIFICATE OF CORRECTION

PATENT NO. : 9,745,400 B2
APPLICATION NO. : 15/119567
DATED : August 29, 2017
INVENTOR(S) : Hiroaki Nakao and Eiji Masuda It is certified that error appears in the above-identified patent and that said Letters Patent is hereby corrected as shown below:

On the Title Page

Item (57) Abstract, Line 2, after "polyacetal" insert --copolymer--.

Item (57) Abstract, Line 14, after "polyacetal" insert --copolymer--.

In the Specification

Column 9, Line 40, "$xM_2^IO \cdot pM_2^{VI}O_6 \cdot yH_2O$" should be --$xM_2^IO \cdot pM_2^VO_6 \cdot yH_2O$--.

In the Claims

Column 22, Line 54 (Claim 5), after "according" insert --to--.

Column 22, Line 62 (Claim 6), "$H_x[M_m.M'_nO_l].yH_2O$ tm" should be --$H_x[M_m.M'_nO_l].yH_2O$--.

Column 23, Line 16 (Claim 8), "$xM^I{}_2O \cdot pM^v{}_2O_6 \cdot yH_2O$" should be --$xM^I{}_2O \cdot pM^V{}_2O_6 \cdot yH_2O$--.

Column 23, Line 20 (Claim 8), "$M^I$represents" should be --$M^I$ represents--.

Column 24, Line 5 (Claim 10), "1, 3" should be --1,3--.

Column 24, Line 6 (Claim 10), "1, 4" should be --1,4--.

Column 24, Line 9 (Claim 11), after "according" insert --to--.

Signed and Sealed this
Eighth Day of May, 2018

Andrei Iancu
*Director of the United States Patent and Trademark Office*